United States Patent [19]
Maplestone

[11] Patent Number: 5,530,723
[45] Date of Patent: Jun. 25, 1996

[54] AUTOMATIC FREQUENCY CONTROL ARRANGEMENT

[75] Inventor: David B. Maplestone, Swindon, United Kingdom

[73] Assignee: Plessey Semiconductors Limited, United Kingdom

[21] Appl. No.: 285,407

[22] Filed: Aug. 3, 1994

[30] Foreign Application Priority Data

Aug. 6, 1993 [GB] United Kingdom ............... 9316363

[51] Int. Cl.$^6$ ................................................. H04L 27/06
[52] U.S. Cl. .......................... 375/344; 455/324; 455/258
[58] Field of Search .......................... 375/344; 329/300, 329/302; 455/255, 324, 256, 257, 258, 259, 164.2, 182.2, 192.2

[56] References Cited

U.S. PATENT DOCUMENTS

| | | | |
|---|---|---|---|
| 4,523,324 | 6/1985 | Marshall | 375/344 |
| 4,647,864 | 3/1987 | Rafferty et al. | 329/122 |
| 5,150,382 | 9/1992 | Kume | 375/88 |
| 5,208,835 | 5/1993 | Weeks et al. | 375/45 |
| 5,434,889 | 7/1995 | Buier | 375/344 |

FOREIGN PATENT DOCUMENTS

| | | |
|---|---|---|
| 2137836 | 10/1984 | United Kingdom . |
| 2213663 | 8/1989 | United Kingdom . |
| 2245442 | 1/1992 | United Kingdom . |

*Primary Examiner*—Stephen Chin
*Assistant Examiner*—Kevin Kim
*Attorney, Agent, or Firm*—Kirschstein et al.

[57] ABSTRACT

An automatic frequency control (AFC) arrangement for use in a symmetrically modulated, homodyne FSK receiver or transceiver forms a value representing the baseband frequency for each of demodulated data states "1" and "0" by measuring the frequency (54, 56; 80, 82) during the appropriate data state, stores it (58, 60; 84, 86) during the opposite data state, and subjects the two stored values to a subtraction process in a difference-forming means (64, 88), the output of which is then used to effect control of the frequency of the local oscillator (32). The AFC arrangement may be realized by analogue techniques, using one or more frequency-to-voltage converters and sample-and-hold units, or by digital techniques, using one or more counters and latches, or by software techniques.

18 Claims, 2 Drawing Sheets

AUTOMATIC FREQUENCY CONTROL ARRANGEMENT

BACKGROUND OF THE INVENTION

The invention concerns an automatic frequency control arrangement, and in particular an automatic frequency control arrangement for use in a homodyne FSK (frequency shift keying) receiver or transceiver.

Communication systems are known which operate by modulating a carrier according to the binary state of a data signal to be transmitted. In such systems, a binary "1" causes the carrier frequency to be shifted by a certain amount in one direction, while a binary "0" causes normally an equal shift in the opposite direction. For this reason, the technique is known as "frequency shift keying" (FSK) and when the shifts are the same in both directions, "symmetrical frequency shift keying".

The local oscillator of a receiver in such an FSK system normally operates at the same frequency as the transmitter carrier, with the result that the signal at the output of the receiver mixer is at baseband IF frequency. This technique is known as "direct conversion" or "homodyne conversion". In an ideal system, where the local oscillator and transmitting oscillator frequencies are the same and the carrier is modulated symmetrically, i.e. is modulated plus and minus, respectively, by equal amounts for the two data states, the mixer output should always be at the same frequency, the baseband frequency, regardless of whether a "1" or a "0" is being received. There will, however, be a phase difference between the I and the Q channels due to the opposing signs of the modulating frequencies for the two data states, and it is this phase difference which is processed in the four-phase detector 44 to reconstitute the transmitted data.

In a practical system, however, there may well be a difference between the carrier and local oscillator frequencies due to drifts in either or both of the oscillators. This drift may be due to various factors such as temperature variations, ageing, etc. When this occurs, the received IF frequency for a "1" state will be different from that for a "0" state and as a result the four-phase detector may be unable reliably to extract the transmitted data; indeed, when drift is excessive data may be totally lost.

It is an aim of the invention to provide an automatic frequency control arrangement which overcomes the above drawback.

SUMMARY OF THE INVENTION

According to a first aspect of the invention, there is provided an automatic frequency control arrangement, for use in a homodyne FSK receiver, comprising: means for inputting a baseband signal from the receiver; means for inputting a data signal from the receiver; means for forming first and second values representative of the frequency of the baseband signal for a first data state and for a second data state, respectively; means for forming the difference of the first and second values to provide a difference signal, and means for applying the difference signal to a local oscillator in the homodyne receiver to control the frequency of the oscillator.

The invention gives rise to a number of advantages when used in a symmetrical FSK homodyne receiver: principally, that all sources of drift, e.g. temperature, are compensated for by the closed loop of the AFC circuit, and also that, since the AFC circuit operates at audio frequencies (typically 4.5 kHz), it can be built very cheaply using non-critical components and layout.

The circuit may be employed in either a single-quadrant or a multi-quadrant FSK receiver.

The invention is useful not only for correcting for drift in the local oscillator of a receiver, but also for correcting for drift in a transmitting oscillator employed in a transceiver.

The circuit may be realised in either analogue or digital form. In the analogue case, the baseband frequency for each of the first and second data states is converted into a corresponding value by a frequency-to-voltage converting means and this value is held, when the data signal changes state, in an associated sample-and-hold means, one per data state. The outputs of the two sample-and-hold means are taken to a difference-forming means, which is preferably realised as a difference amplifier, and the output of the difference-forming means is used to correct the frequency of the oscillator.

Either one frequency-to-voltage converting means may be used, fed directly from the baseband signal, the converting means being switched to one or other of the two sample-and-hold means in accordance with the data signal state, or two frequency-to-voltage converting means may be used, one per sample-and-hold means, the baseband signal being switched to one or other of the frequency-to-voltage converting means according to the data signal state.

A digital realisation of the circuit according to the invention employs counting means and latching means instead of frequency-to-voltage converting means and sample-and-hold means to form and store a value representing the baseband frequency for each of the first and second data states. Instead of a difference amplifier, the difference-forming means is constituted by a digital subtracting means, which takes the difference between the contents of the two latches and passes it on to the control input of the local oscillator. Where the oscillator will accept a digital control input directly, as in a digitally controlled frequency synthesiser, for example, the output of the digital subtracting means may be used to effect control without further processing; where, however, the oscillator requires an analogue control input, it is necessary to interpose a digital-to-analogue converter between the digital subtracting means and the oscillator.

As an alternative to analogue or digital realisation, the invention may be put into effect using software techniques.

According to a second aspect of the invention, there is provided a homodyne FSK receiver or transceiver, comprising an automatic frequency control arrangement as described above.

According to a third aspect of the invention, there is provided a method of controlling frequency in a homodyne FSK receiver or transceiver, comprising the steps of: forming a value representative of the frequency of the baseband signal for a first data state; forming a value representative of the frequency of the baseband signal for a second data state; forming the difference of the two values to provide a difference signal, and applying the difference signal to a local oscillator to control the frequency of the oscillator.

The method may perform the steps of: converting the baseband frequency representative of a first data state to a corresponding first voltage signal, while storing a second voltage signal corresponding to the baseband frequency representative of a preceding second data state; converting the baseband frequency representative of a succeeding second data state to a corresponding second voltage signal, while storing the first voltage signal corresponding to the baseband frequency representative of the first data state; forming the difference of the two stored voltages and applying the difference signal to the local oscillator in the receiver to control the frequency of the oscillator.

The baseband frequency may be converted into first and second analogue voltage signals, or alternatively into first and second digital voltage signals.

BRIEF DESCRIPTION OF THE DRAWINGS

The invention will now be described, by way of example only, with reference to the drawings, of which.

DETAILED DESCRIPTION OF THE INVENTION

Figure 1:
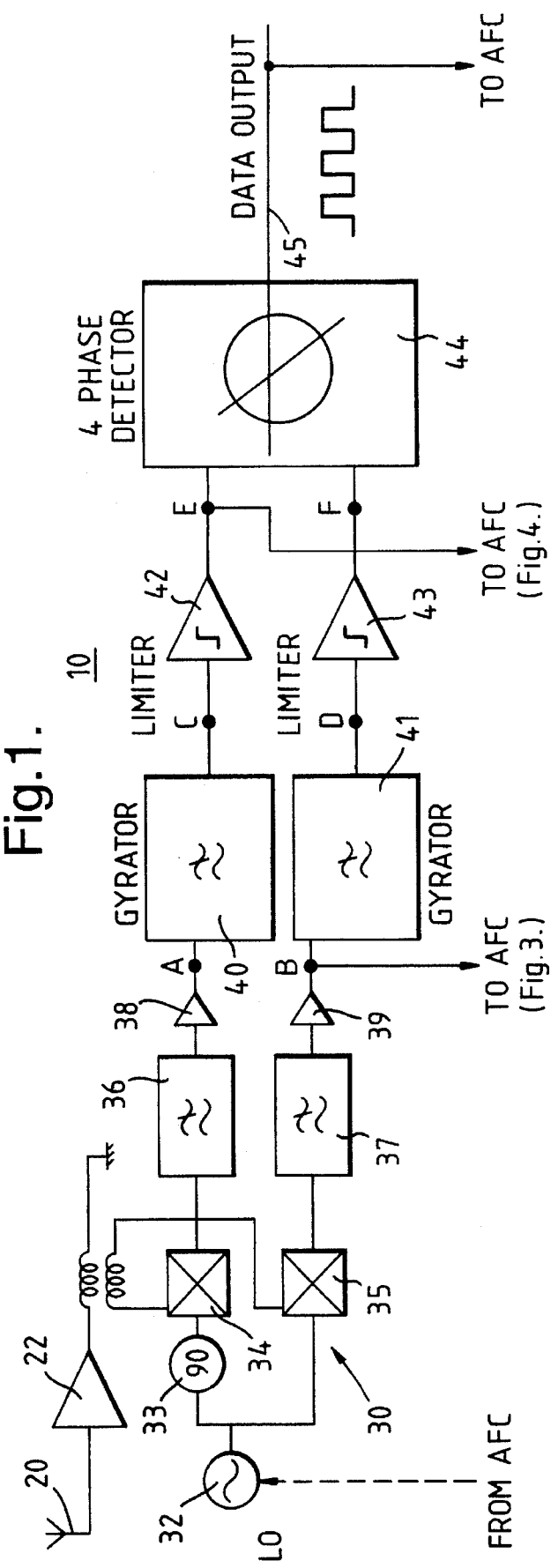
FIG. 1 is a schematic diagram of an FSK receiver and demodulator circuit according to the invention.
Figure 3:
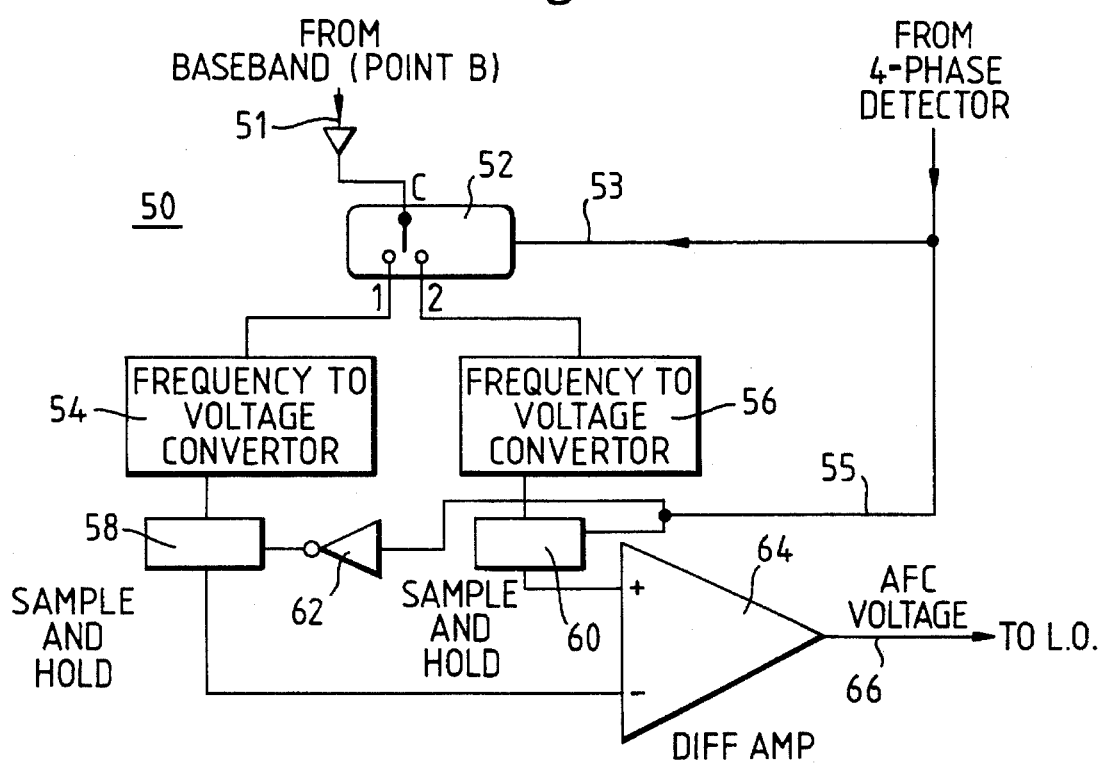
FIG. 3 is a schematic diagram of an automatic frequency control arrangement according to a first embodiment of the invention.

An AFC arrangement according to a first embodiment of the invention is shown in FIG. 3 in conjunction with FIG. 1. A receiver and demodulator circuit 10 of FIG. 1 comprises an antenna 20, RF amplifier 22, synchronous demodulator 30, filters 36, 37, 40, 41 and further amplifiers 38, 39, limiters 42, 43 and a four-phase detector 44. A transmitted FSK signal, in which a data "1" state is represented by the carrier frequency modulated by, say, $+f_m$ and a data "0" state is represented by the carrier frequency modulated by $-f_m$, is received by the antenna 20, amplified in the RF amplifier 22 and fed to the synchronous detector 30. The synchronous detector 30 comprises a local oscillator 32 and a 90° phase shifter 33 feeding, respectively, mixers 35 and 34. The RF signal from the amplifier 22 is fed to the other input of each of the mixers 34, 35 and the mixer outputs, which are in quadrature with each other, are taken to filters 36, 37, amplifiers 38, 39 and further filters 40, 41 before being amplitude-limited in limiters 42 and 43. The limited in-phase and quadrature signals are then processed in the four-phase detector 44, where the original transmitted data information is extracted and output along line 45.

The filters 36, 37, 40 and 41 are all low-pass filters. The latter pair may, in practice, take the form of gyrators.

An AFC circuit 50 (see FIG. 3) is connected to a point B of FIG. 1 and to the data output line 45. Although the baseband signal can be taken from any of points A–F, point A is chosen in this case in order to obtain a wide capture range, though this is at the expense of a narrow dynamic range, since point A is upstream of the limiting stages 42, 43. The baseband signal on line 51 (see FIG. 3) is taken to the common pole C of a changeover switch 52, which in practice is a MOSFET analogue switch. The changeover poles 1, 2 of the switch 52 are connected to the inputs of frequency-to-voltage converters 54, 56, the outputs of each of which are taken to a sample-and-hold 58, 60. The sample-and-hold outputs feed a difference amplifier 64 which delivers, on line 66, an AFC signal for application to the oscillator to be controlled.

The data output from the FSK demodulator (line 45 of FIG. 1) is taken along line 53 to the control input of the switch 52 and along line 55 to the control inputs of sample-and-holds 58, 60. An inverter 62 is included in the control line to one of the two sample-and-holds, so that they may be driven in anti-phase.

In practice, the frequency of the local oscillator 32 will not remain absolutely constant, but will experience drift. The effect of such a drift can be seen in FIG. 2, where the upper line shows the transmitted data, consisting of binary states, "1" and "0", and the lower line shows the baseband signal at any of points A–F. This baseband signal can be seen to vary in frequency, depending on the data state being transmitted. To give a concrete example, if it is assumed that the modulation frequency, $f_m$, for each of the two data states is 4.5 kHz and the local oscillator, for example, has drifted high by 1 kHz, then the baseband frequency for, say, a "1" will be 4.5 kHz–1 kHz=3.5 kHz, while that for a "0" will be 4.5 kHz+1 kHz=5.5 kHz.

Figure 2:
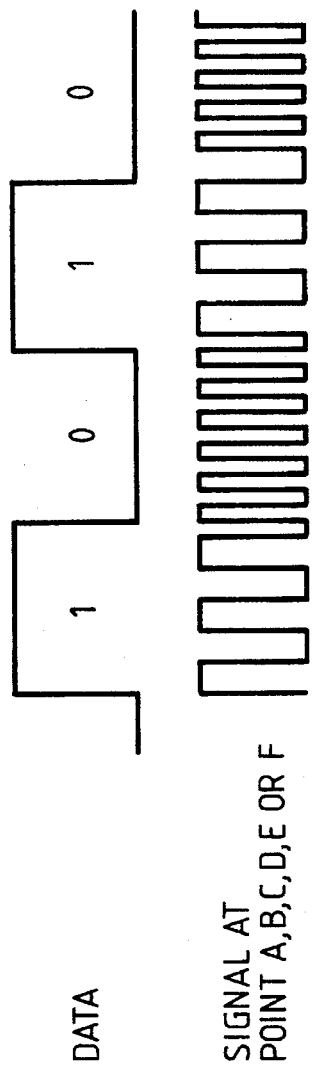
FIG. 2 is a diagram showing the change in frequency of the baseband signal for a change in state of the data output signal in a non-ideal FSK receiver.

The frequency-controlling operation of this first embodiment is as follows:

Assume, firstly, that the local oscillator in demodulator 10 has drifted high, resulting in the baseband signal shown in FIG. 2; secondly, that frequency-to-voltage converter 54 is allotted to the data "1" state, while frequency-to-voltage converter 56 is allotted to the data "0" state; thirdly, that the demodulator 10 has started to register a data "1" state, having previously received a data "0" state. Upon the change of data state from "0" to "1", the analogue switch 52 switches to pole 1 and transfers the baseband signal from line 51 to converter 54. Converter 54 now converts the lower-than-normal baseband frequency into a corresponding voltage, which is sampled in sample-and-hold 58 and passed on to the difference amplifier 64. Meanwhile, the same change in state of the data signal has instructed the sample-and-hold 60 to hold the voltage corresponding to the higher-than-normal baseband frequency for the previous "0" data state, and this voltage is also passed on to difference amplifier 64. Difference amplifier 64 then subtracts the data "1" voltage from the data "0" voltage to form an output AFC voltage on line 66 which is fed back to the drifted oscillator in such a sense as to reduce the difference between the data "1" and data "0" baseband frequencies.

In similar fashion, when the data output changes from a "1" to a "0" state, switch 52 changes over to pole 2, transferring the baseband signal on line 51 to converter 56, where its frequency is converted into a voltage which is sampled by sample-and-hold 56 and passed on to amplifier 64. At the same time, sample-and-hold 58 is forced into its "hold" mode, so that the voltage output of converter 54 for the "1" state is held in sample-and-hold 58 and likewise fed to amplifier 64. Amplifier 64 forms the difference between the two voltages and sends this as a correcting signal back to the oscillator as before.

Clearly, it is possible, instead of employing two frequency-to-voltage converters, to use only one situated upstream of the analogue switch 52. Poles 1 and 2 of switch 52 would then be taken directly to the inputs of the sample-and-holds 58, 60. While this would undoubtedly be more economical in hardware, there could well be a risk of charge-injection problems from the changeover of the data signal state, since switch 52 would be handling not alternating signals, in which frequency, not DC level, was important, but DC signals from the frequency-to-voltage converter output.

Figure 4:
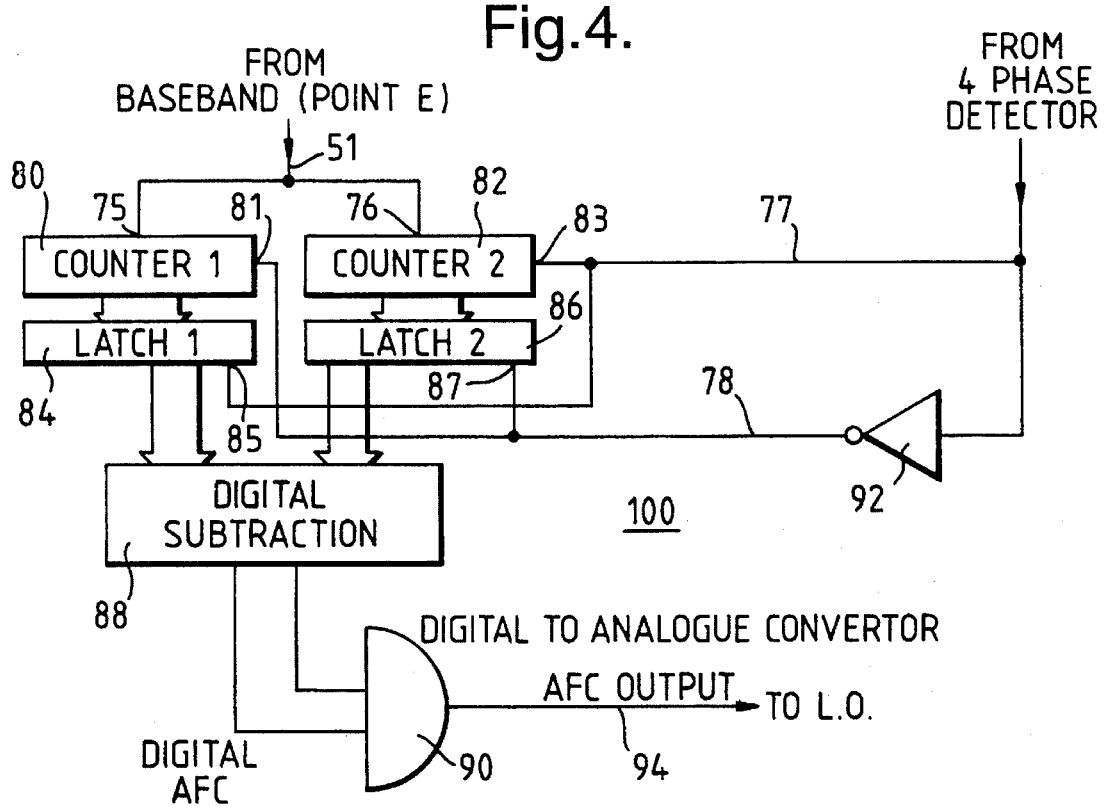
FIG. 4 is a schematic diagram of an automatic frequency control arrangement according to a second embodiment of the invention.

A second embodiment of the invention, illustrated in FIG. 4 in conjunction with FIG. 1, employs digital techniques instead of analogue. In this embodiment, the receiver and demodulator 10 is interfaced with a digital version 100 of the AFC circuit of the invention, the interfacing being arranged this time to allow for a wide dynamic range at the expense of capture range. This is achieved by taking the baseband signal from a point E of the receiver circuitry in FIG. 1. Since this point is downstream of the limiter 42, the AFC circuit will work with an increased dynamic range over the arrangement shown in FIG. 3.

In the AFC arrangement 100 of FIG. 4, the baseband signal is taken on line 51 to the clocking inputs 75, 76 of two counters 80, 82, which correspond in this embodiment to the frequency-to-voltage converters of the previous embodiment. Each counter feeds a latch 84, 86, the output of which is taken to a digital subtractor 88. The data output signal from line 45 of FIG. 1 is taken directly to gating input 83 of counter 82 and to latch-command input 85 of latch 84; similarly, an inverted version of the data output signal, by virtue of inverter 92, is taken to the gating input 81 of counter 80 and to the latch-command input 87 of latch 86. The output of the digital subtractor is taken to a D/A converter 90, the output of which is fed along line 94 back to the oscillator whose frequency is to be corrected.

Looking at the mode of operation of this embodiment now, it is again assumed firstly that the local oscillator in demodulator 10 has drifted high, resulting in the baseband signal shown in FIG. 2; secondly, that counter 80 is allotted to the data "1" state, while counter 82 is allotted to the data "0" state; thirdly, that the demodulator 10 has started to register a data "1" state, having previously received a data "0" state. At the changeover from data "0" to data "1", line 77 goes high and, assuming the gate inputs 81, 83 and latch-command inputs 85, 87 to be low-active, counter 82 is inhibited from counting, while, by virtue of the inverter 92 in the control line 78 to counter 80 and latch 86, counter 80 starts to count at a rate corresponding to the baseband frequency for data state "1". At the same time, due to the low on line 78, latch 86 latches the count for the "0" state present in counter 82 at the transition from data "0" to data "1", while the high on line 77 inhibits the latching action of latch 84.

The same action applies, but with both counters and latches reversed, at the transition from data "1" to data "0".

Note that, in practice, the data string appearing on line 77 of FIG. 4 would not consist exclusively of alternating "1"s and "0"s, but would occasionally consist of two or more consecutive similar states. In this situation, were the gating period of the counters 80 and 82 to correspond literally to the data "1" or data "0" time slots, unequal gating periods would result for the two counters, resulting in a false indication of baseband frequency for one or other of the two data states. To overcome this, counters 80, 82 are in practice equipped with some kind of monostable gating input, such that they respond to the signal at their inputs 81, 83 by allowing gating to occur only over a fixed period set by the monostable.

As with the analogue embodiment of FIG. 3, it may be possible in this embodiment also to dispense with one of the counters by switching the output of a single counter between the latches 84, 86 at each data change, arranging for the previous count to be latched before counting is restarted. Clearly, however, any saving made in counter hardware is at least partly offset by the need for digital switching hardware.

While the invention has been described in terms of the derivation of an AFC signal from a changing data output, the invention is not restricted to providing an AFC signal only when data is seen at the output. Thus, even when data is lost due to excessive drift, the arrangement according to the invention will still provide an AFC direction signal. This is primarily due to the fact that the output data signal will remain in either the high or low state when excessive frequency error occurs.

It is also stressed that, while the first and second embodiments of the invention have been described as picking up their baseband signals from points B and E, respectively, of FIG. 1, the baseband pickup point may be at any of the points A–F, i.e. either before or after the filters 40, 41, or indeed, after the limiters 42, 43.

I claim:

1. An automatic frequency control arrangement, for use in a homodyne FSK receiver, comprising: means (51, 52) for inputting a baseband signal from the receiver; means (53, 55; 77, 78, 92) for inputting a data signal from the receiver; means (54, 56; 80, 82) for forming first and second values representative of the frequency of the baseband signal for a first data state and for a second data state, respectively; means (58, 60, 64; 84, 86, 88) for forming the difference of first and second values to provide a difference signal, and means (66; 90) for applying the difference signal to a local oscillator in the homodyne receiver to control the frequency of the oscillator.

2. An automatic frequency control arrangement, as claimed in claim 1, in which the means for forming first and second values representative of the frequency of the baseband signal for a first data state and for a second data state comprises first and second frequency-to-voltage converting means (54, 56), respectively, and the difference-forming means comprises first and second sample-and-hold means (58, 60) and a difference amplifier (64), the first and second sample-and-hold means (58, 60) having respective signal inputs which are fed from respective outputs of the first and second frequency-to-voltage converting means (54, 56), and the difference amplifier (64) having a first input which is fed from an output of the first sample-and-hold means (58) and a second input which is fed from an output of the second sample-and-hold means (60).

3. An automatic frequency control arrangement, as claimed in claim 2, in which the means for inputting a baseband signal from the receiver comprises a changeover switching means (52), the changeover switching means (52) having a common terminal (C) and first and second changeover terminals (1, 2), the common terminal (C) serving to receive the baseband signal, and the first and second changeover terminals (1, 2) being connected to respective inputs of the first and second frequency-to-voltage converting means (54, 56).

4. An automatic frequency control arrangement for use in a homodyne FSK receiver, comprising:

a means for inputting a data signal from the receiver;

a changeover switching means for inputting a baseband signal from the receiver, said changeover switching means having a common terminal and first and second changeover terminals, said common terminal serving to receive the baseband signal;

first and second frequency-to-voltage converting means having respective inputs and respective outputs, said inputs being connected to respective first and second changeover terminals;

first and second sample-and-hold means having respective signal inputs and respective outputs, said signal inputs being fed from respective outputs of said first and second frequency-to-voltage converting means;

a difference amplifier having first and second inputs fed from respective outputs of said first and second sampleand-hold means and an output for providing a difference signal, and a means for applying said difference signal to a local oscillator in the homodyne receiver to control the frequency of the oscillator, said means for inputting a data signal being arranged to control the first and second sample-and-hold means and the changeover switching means such that when the data signal changes from its second to its first data state, the baseband signal is received by the first frequency-to-voltage converting means and its corresponding voltage value is sampled by the first sample-and-hold means while a voltage value corresponding to the frequency of the baseband signal for the previous second data state is held in the second sample-and-hold means, and when the data signal changes from its first to its second data state, the baseband signal is received by the second frequency-to-voltage converting means and its corresponding voltage value is sampled by the second sample-and-hold means while a voltage value corresponding to the frequency of the baseband signal for the previous first data state is held in the first sample-and-hold means.

5. An automatic frequency control arrangement, as claimed in claim 1, in which the means for forming first and second values representative of the frequency of the baseband signal for a first data state and for a second data state comprises a frequency-to-voltage converting means, and the difference-forming means comprises a changeover switching means, first and second sample-and-hold means (58, 60) and a difference amplifier (64), wherein the frequency-to-voltage converting means has an input which serves to receive the baseband signal, the changeover switching means has a common terminal (C) and first and second changeover terminals (1, 2), the common terminal being connected to an output of the frequency-to-voltage converting means, and the first and second changeover terminals (1, 2) being connected to respective signal inputs of the first and second sample-and-hold means (58, 60), and the difference amplifier (64) has a first input which is fed from an output of the first sample-and-hold means (58) and a second input which is fed from an output of the second sample-and-hold means (60).

6. An automatic frequency control arrangement for use in a homodyne FSK receiver, comprising:

a means for inputting a data signal from the receiver;

a frequency-to-voltage converting means having an input and an output, said input serving to receive a baseband signal from the receiver;

a changeover switching means having a common terminal and first and second changeover terminals, said common terminal being connected to said output of said frequency-to-voltage converting means;

first and second sample-and-hold means having respective signal inputs and respective outputs, said signal inputs being fed from respective outputs of said changeover switching means;

a difference amplifier having first and second inputs fed from respective outputs of said first and second sample-and-hold means and an output for providing a difference signal, and a means for applying said difference signal to a local oscillator in the homodyne receiver to control the frequency of the oscillator, said means for inputting a data signal being arranged to control the first and second sample-and-hold means and the changeover switching means such that when the data signal changes from its second to its first data state, a voltage corresponding to a frequency of the baseband signal is sampled by the first sample-and-hold means while a voltage corresponding to a frequency of the baseband signal for the previous second data state is held in the second sample-and-hold means, and when the data signal changes from its first to its second data state, a voltage corresponding to the frequency of the baseband signal is sampled by the second sample-and-hold means while a voltage corresponding to the frequency of the baseband signal for the previous first data state is held in the first sample-and-hold means.

7. An automatic frequency control arrangement, as claimed in claim 1, in which the means for forming first and second values representative of the frequency of the baseband signal for a first data state and for a second data state comprises first and second counting means (80, 82), respectively, and the difference-forming means comprises first and second latching means (84, 86) and a digital subtracting means (88), the first and second latching means (84, 86) having respective inputs which are fed from the first and second counting means (80, 82), respectively, and the digital subtracting means (88) having a first input which is fed from an output of the first latching means (84) and a second input which is fed from an output of the second latching means (86).

8. An automatic frequency control arrangement, as claimed in claim 7, in which the first and second counting means (80, 82) have respective clocking inputs (75, 76) which are arranged to receive the baseband signal, and the means for inputting a data signal is arranged to control the first and second counting means (80, 82) and the first and second latching means (84, 86) such that when the data signal changes from its second to its first data state, counting is started in the first counting means (80) and stopped in the second counting means (82), the contents of the second counting means (82) being latched in the second latching means (86), and when the data signal changes from its first to its second data state, counting is started in the second counting means (82) and stopped in the first counting means (80), the contents of the first counting means (80) being latched in the first latching means (84).

9. An automatic frequency control arrangement for use in a homodyne FSK receiver, comprising:

a means for inputting a data signal from the receiver;

a means for inputting a baseband signal from the receiver;

first and second counting means having respective clocking inputs and respective outputs, said clocking inputs serving to receive said baseband signal;

first and second latching means having respective signal inputs, respective latching inputs and respective outputs, said signal inputs being connected to respective outputs of said first and second counting means;

a digital subtracting means having first and second inputs fed from respective outputs of said first and second latching means and an output for providing a difference signal, and a means for applying said difference signal to a local oscillator in the homodyne receiver to control the frequency of the oscillator, said means for inputting a data signal being arranged to control the first and second counting means and the first and second latching means such that when the data signal changes from its second to its first data state, counting is started in the first counting means and stopped in the second counting means, the contents of the second counting means being latched in the second latching means, and when the data signal changes from its first to its second data state, counting is started in the second counting means and stopped in the first counting means, the contents of the first counting means being latched in the first latching means.

10. An automatic frequency control arrangement, as claimed in claim 3 or claim 4, in which the means for inputting a data signal is arranged to control the changeover switching means (52) and the first and second sample-and-hold means (58, 60) such that when the data signal is in its first state, a value corresponding to the input baseband signal frequency for that state is sampled by the first sample-and-hold means (58) while a value corresponding to the input baseband signal frequency for the second state is held by the second sample-and-hold means (60), and when the data signal is in its second state, a value corresponding to the input baseband signal frequency for that state is sampled by the second sample-and-hold means (60) while a value corresponding to the input baseband signal frequency for the first state is held by the first sample-and-hold means (58).

11. A homodyne FSK receiver or transceiver, comprising an automatic frequency control arrangement as claimed in claim 1.

12. A method of controlling frequency in a homodyne FSK receiver, comprising the steps of: forming a value representative of the frequency of a baseband signal for a first data state; forming a value representative of the frequency of the baseband signal for a second data state; forming the difference of the two values to provide a difference signal, and applying the difference signal to a local oscillator in the receiver to control the frequency of the oscillator.

13. A method of controlling frequency in a homodyne FSK receiver, as claimed in claim 12, comprising the steps of: converting the baseband frequency representative of a first data state to a corresponding first voltage signal, while storing a second voltage signal corresponding to the baseband frequency representative of a preceding second data state; converting the baseband frequency representative of a succeeding second data state to a corresponding second voltage signal, while storing the first voltage signal corresponding to the baseband frequency representative of the first data state; forming the difference of the two stored voltages and applying the difference signal to the local oscillator in the receiver to control the frequency of the oscillator.

14. A method of controlling frequency in a homodyne FSK receiver, as claimed in claim 13, in which the baseband frequency is converted into first and second analogue voltage signals.

15. A method of controlling frequency in a homodyne FSK receiver, as claimed in claim 13, in which the baseband frequency is converted into first and second digital voltage signals.

16. An automatic frequency control arrangement, as claimed in claim 5 or claim 6, in which the means for inputting a data signal is arranged to control the changeover switching means (52) and the first and second sample-and-hold means (58, 60) such that when the data signal is in its first state, a value corresponding to the input baseband signal frequency for that state is sampled by the first sample-and-hold means (58) while a value corresponding to the input baseband signal frequency for the second state is held by the second sample-and-hold means (60), and when the data signal is in its second state, a value corresponding to the input baseband signal frequency for that state is sampled by the second sample-and-hold means (60) while a value corresponding to the input baseband signal frequency for the first state is held by the first sample-and-hold means (58).

17. An automatic frequency control arrangement, as claimed in claim 8 or claim 9, in which control of the first and second counting means (80, 82) and of the first and second latching means (84, 86) is by way of first and second gating inputs and first and second latch-command inputs respectively provided in said counting means and latching means.

18. An automatic frequency control arrangement, as claimed in claim 17, in which the means for applying the difference signal to the local oscillator comprises a digital-to-analogue converter (90) fed from an output of the digital subtracting means (88).

* * * * *